(12) United States Patent
Matsumoto

(10) Patent No.: US 7,177,523 B2
(45) Date of Patent: Feb. 13, 2007

(54) IMAGE REPRODUCTION APPARATUS

(75) Inventor: Mutsumi Matsumoto, Kanagawa (JP)

(73) Assignee: Canon Kabushiki Kaisha, Toyko (JP)

(*) Notice: Subject to any disclaimer, the term of this patent is extended or adjusted under 35 U.S.C. 154(b) by 1030 days.

(21) Appl. No.: 10/213,188

(22) Filed: Aug. 6, 2002

(65) Prior Publication Data

US 2003/0030739 A1    Feb. 13, 2003

(30) Foreign Application Priority Data

Aug. 9, 2001   (JP)   .............. 2001-242015

(51) Int. Cl.
H04N 5/76    (2006.01)
H04N 5/00    (2006.01)
H04N 5/222   (2006.01)

(52) U.S. Cl. .............. 386/68; 386/117; 348/333.01

(58) Field of Classification Search ............. 386/6–8, 386/38, 68–70, 117; 348/333.01, 333.05; 345/619; 715/719, 720
See application file for complete search history.

(56) References Cited

U.S. PATENT DOCUMENTS

| | | | | |
|---|---|---|---|---|
| 5,812,736 A | * | 9/1998 | Anderson | 386/96 |
| 6,310,648 B1 | * | 10/2001 | Miller et al. | 348/333.05 |
| 6,587,119 B1 | * | 7/2003 | Anderson et al. | 345/672 |
| 6,734,876 B2 | * | 5/2004 | Niikawa et al. | 345/698 |

FOREIGN PATENT DOCUMENTS

CN          1206288          1/1999

* cited by examiner

Primary Examiner—Thai Q. Tran
Assistant Examiner—Nigar Chowdhury
(74) Attorney, Agent, or Firm—Cowan, Liebowitz & Latman, P.C.

(57) ABSTRACT

An image reproduction apparatus comprises a reproduction unit for reproducing an image recorded on an image recording medium, a display control unit for displaying, on a display unit such as a monitor display, the image reproduced by the reproduction unit, a renewal unit for renewing the image displayed on the display unit, and a control unit for, in accordance with the number of images recorded on the recording medium and the number of images renewed by the renewal unit, changing the interval at which the renewal unit renews the displayed image.

28 Claims, 3 Drawing Sheets

IMAGE REPRODUCTION APPARATUS

BACKGROUND OF THE INVENTION

1. Field of the Invention

The present invention relates to an image reproduction apparatus and a method therefor that are appropriate for a digital camera or a video camera capable of recording or reproducing both moving images and static images.

2. Related Background Art

Recently, digital cameras or video cassette recorders having built-in cameras have been produced that record moving and static images on a memory card.

When these products are employed to search for and to reproduce and display a desired image recorded on a memory card, which serves as the recording medium, a processing method is employed whereby, while searching for the desired image, an image feed switch is manipulated and recorded images are sequentially reproduced on a display for confirmation.

Further, in order to simplify the image search operation, another method is also employed whereby images continue to be automatically and repetitively fed, at corresponding predetermined intervals, while an image feed switch is on (is depressed and held down), and whereby the image feeding process is halted when the image feed switch is turned off (is released).

However, for the image search operation during which image feeding, at corresponding predetermined time intervals, is automatically continued by depressing and holding down an image feed switch, the reproduction of an image depends merely upon the elapse of a specific time interval. Therefore, when, for example, multiple images are recorded on a memory card, an extended period of time can be required to locate a desired image. On the other hand, when only a small number of images are recorded on a memory card and too short a time interval is allocated for image feeding, images may be fed and passed by too quickly, making it rather difficult to locate the one that is desired.

SUMMARY OF THE INVENTION

One object of the present invention is the solving of the above described problems.

Another object of the present invention is the provision of an image reproduction apparatus that can accurately and quickly search for a desired image, regardless of the number of images recorded on a recording medium.

As a preferred embodiment for such objects, an image reproduction apparatus according to the present invention comprises:

reproduction means for reproducing an image recorded on an image recording medium which recorded a plurality of images;

display control means for displaying, on a display unit, the image reproduced by the reproduction means;

renewal means for renewing the image displayed on the display unit; and control means for, in accordance with the number of images recorded on the recording medium, changing the interval at which the renewal means renews displayed image.

Further, an image reproduction apparatus according to the present invention comprises:

reproduction means for reproducing an image recorded on an image recording medium which recorded a plurality of images;

display control means for displaying, on a display unit, the image reproduced by the reproduction means;

renewal means for renewing the image displayed on the display unit; and control means for, in accordance with the number of images renewed by the renewal means, changing the interval at which the renewal means renews displayed image.

Furthermore, an image reproduction apparatus according to the present invention comprises:

reproduction means for reproducing an image recorded on an image recording medium;

display control means for displaying, on a display unit, the image reproduced by the reproduction means;

renewal means for renewing the image displayed on the display unit; and control means for, in accordance with the number of images recorded on the recording medium and the number of images renewed by the renewal means, changing the interval at which the renewal means renews displayed image.

Also, an image reproduction method according to the present invention comprises:

a reproduction step of reproducing an image recorded on an image recording medium which recorded a plurality of images;

a display step of displaying, on a display unit, the image reproduced at the reproduction step;

a renewal step of renewing the image displayed on the display unit; and a control step of, in accordance with the number of images recorded on the recording medium, changing the interval at which displayed image is renewed at the renewal step.

Further, an image reproduction method according to the present invention comprises:

a reproduction step of reproducing an image recorded on an image recording medium which recorded a plurality of images;

a display step of displaying, on a display unit, the image reproduced at the reproduction step;

a renewal step of renewing the image displayed on the display unit; and a control step of, in accordance with the number of images renewed at the renewal step, changing the interval at which displayed image is renewed at the renewal step.

Furthermore, an image reproduction method according to the present invention comprises:

a reproduction step of reproducing an image recorded on an image recording medium which recorded a plurality of images;

a display step of displaying, on a display unit, the image reproduced at the reproduction step;

a renewal step of renewing the image displayed on the display unit; and a control step of, in accordance with the number of images recorded on the recording medium and the number of images renewed at the renewal step, changing the interval at which displayed image is renewed at the renewal step.

Still other objects of the present invention, as well as the advantages afforded thereby, will become fully apparent during the following detailed description of the embodiment.

DETAILED DESCRIPTION OF THE PREFERRED EMBODIMENT

The preferred embodiment of the present invention will hereinafter be described in detail with reference to the accompanying drawings.

Figure 1:
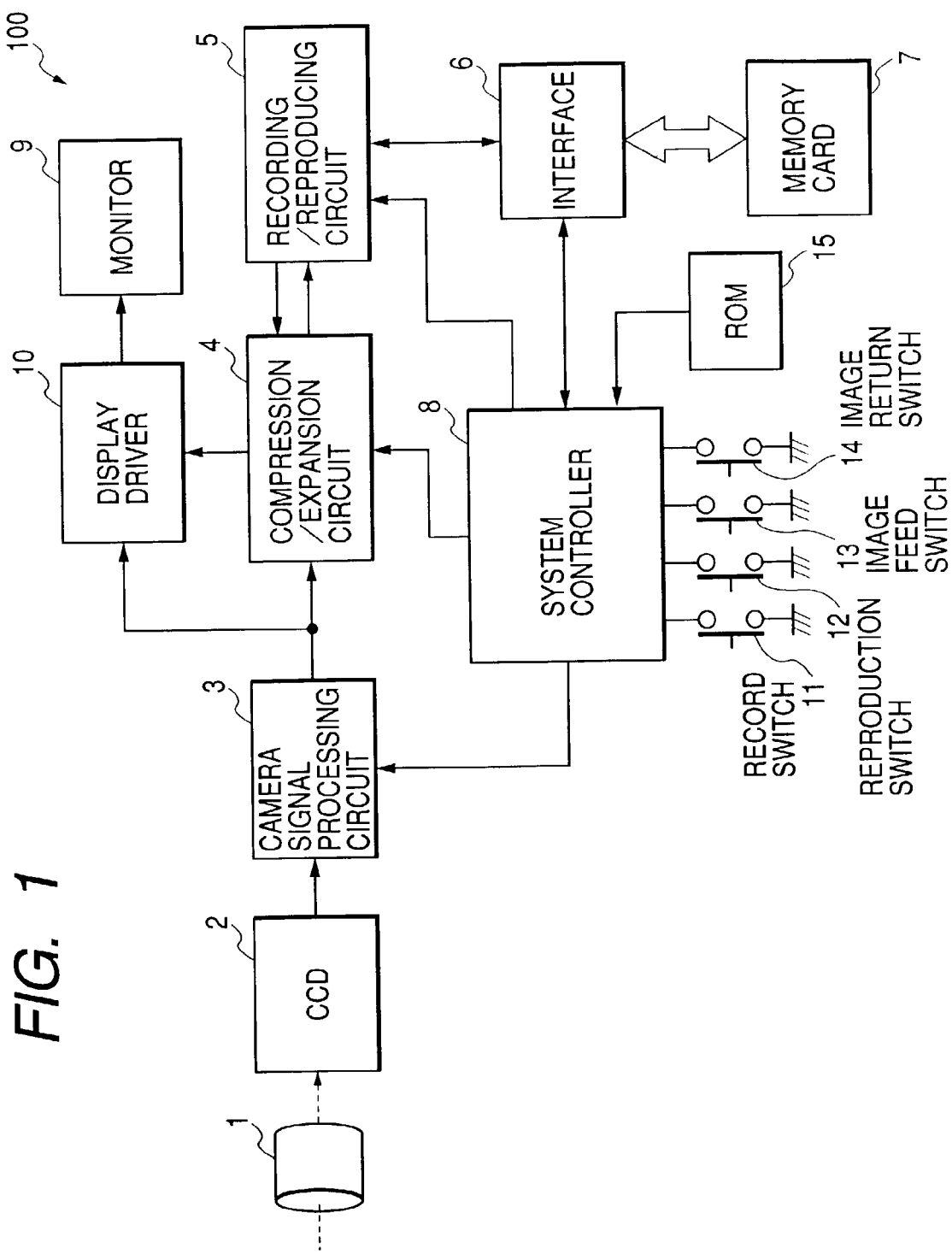
FIG. 1 is a block diagram showing a video camera according to one embodiment of the present invention.

FIG. 1 is a block diagram showing an example image reproduction apparatus that most accurately depicts the feature of the present invention, which is a video camera 100 when the present invention is applied for a camera having a built-in video cassette recorder (or is a digital camera).

In FIG. 1, the video camera 100 comprises: an image pickup unit 1, consisting of a zoom lens or a focusing lens; an image pickup device (CCD) for performing the photo-electric conversion of an optical image acquired by the image pickup unit 1 and for outputting a pickup signal; and a camera signal processing circuit 3 for performing predetermined signal processing for the pickup signal output by the CCD 2 and for generating a luminance signal and a color signal.

A compression/expansion circuit 4 employs a predetermined encoding method to compress the luminance signal and the color signal generated by the camera signal processing circuit, and for the reproduction operation employs a predetermined decoding method to expand compressed image data that are read from a memory card 7.

A recording/reproducing circuit 5 employs a predetermined format when recording image data, compressed by the compression/expansion circuit 4, on the memory card 7, and when reading and reproducing the image data that have been so recorded.

An interface 6 permits the recording/reproducing circuit 5 and the memory card 7 to employ a predetermined data format for exchanging image data.

The memory card 7 is a recording medium, and the present invention can be applied not only for the memory card 7, which employs fixed memory as the main storage medium, but also another recording medium, such as an optical or magnetic disk or a magnetic tape.

A system controller 8 exercises control over the entire system for an image pickup operation and the compression/expansion and recording/reproduction performed by the video camera 100. The operation by which image data are read from the memory card 7, which as the feature of the invention will be described later, is also controlled by the system controller 8. That is, the system controller 8 constitutes overall control means for the video camera 100.

In addition, the system controller 8 reads, as needed, various processing programs stored in a ROM (Read Only Memory) 15, and executes them when performing various types of operations.

A monitor 9, constituted by a liquid crystal display panel, is provided for the display of images, characters and letters.

A display driver 10 transmits to the monitor 9, for display thereon, an image output by the camera signal processing circuit 3, or an image that is reproduced from the memory card 7 and is expanded by the compression/expansion circuit 4.

The monitor 9 corresponds to the display device of the video camera 100 of the invention, and the display driver 10 corresponds to the display control means of the invention.

Various operating switches will now be described. The operating switch group for the video camera 100 includes the following switches:

a recording switch 11, manipulated at a predetermined timing during the image pickup operation, for instructing the transmission by the image pickup unit 1 of the pickup signal through the above described blocks and for recording this signal as compressed image data on the memory card 7;

a reproduction switch 12, manipulated during the reproduction operation, for instructing the reproduction and the expansion of compressed image data on the memory card 7 and for displaying the resultant image on the monitor 9;

an image feed switch 13, manipulated to instruct the sequential reading and reproduction of images recorded on the memory card 7 while, reference to the image file names and the recording times, the images are fed in the forward (+) direction; and an image return switch 14, manipulated to instruct the sequential reading and reproduction of images recorded on the memory card 7 while, reference to the image file names and the recording times, the images are fed in the backward (−) direction (the direction opposite to that in which images are fed when the image feed switch 13 is manipulated).

Under the reproduction condition whereby, in response to the manipulation of the reproduction switch 12, an image read from the memory card 7 is currently displayed on the monitor 9, each time the image feed switch 13 is depressed (ON), the image on the display is shifted to the next image in the forward direction or, each time the image return switch 14 is depressed (ON), it is shifted to the preceding image in the backward direction. Further, when the image feed switch 13 or the image return switch 14 remains in the ON position for a period equal to or longer than a predetermined period of time, all the images on the memory card 7 can be automatically and sequentially reproduced in the ascending order or in the descending order, while referring to their image numbers, their image file names and their image recording times, so that the image on the display can be continuously renewed.

The following image reproduction operation performed by the invention is executed by the image feed switch 13, the image return switch 14 and the system controller 8, which controls the system in accordance with the manipulation of these switches.

The reproduction processing performed by the video camera 100 of the present invention will now be explained while referring to the flowchart in FIG. 2.

Figure 2:
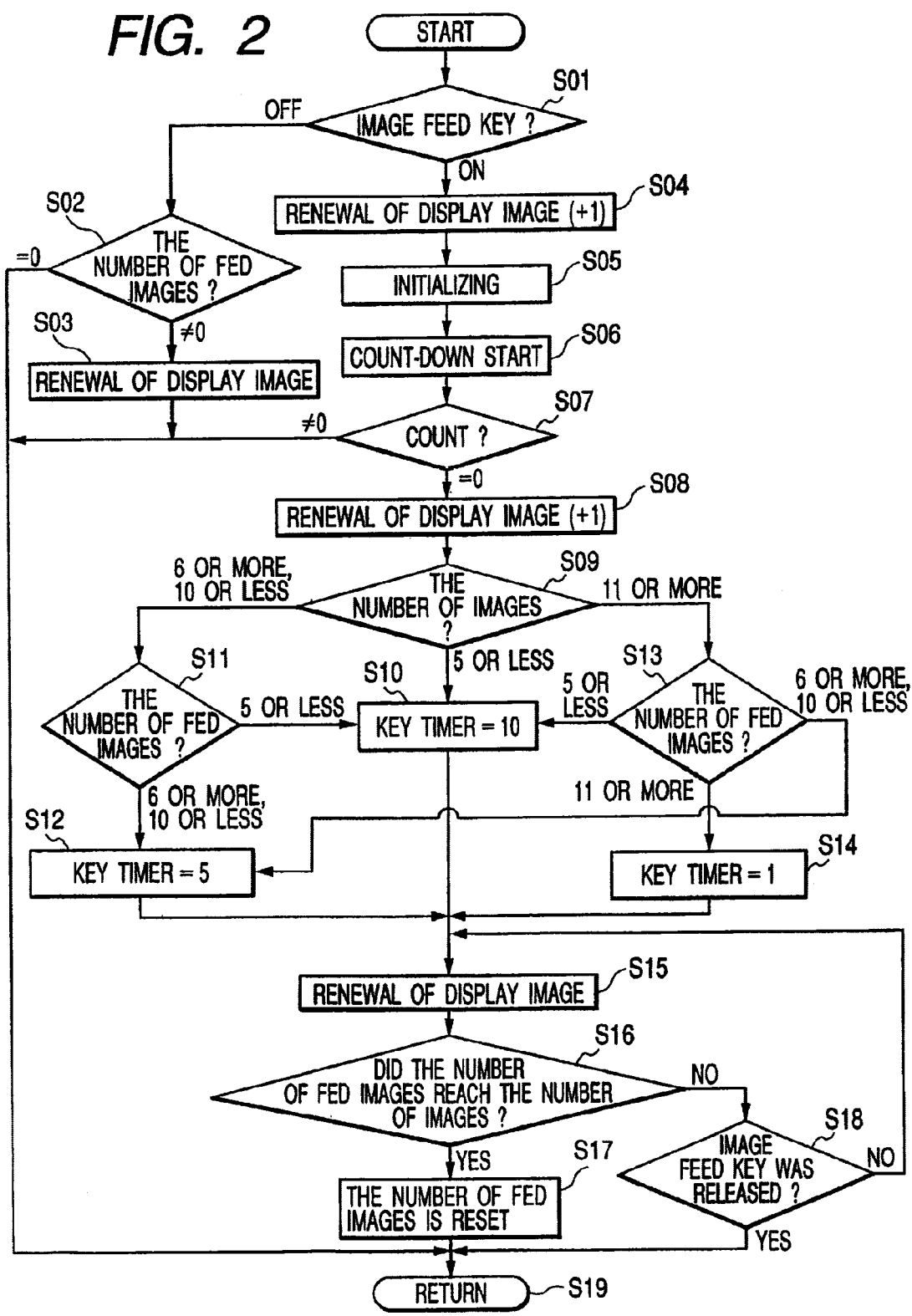
FIG. 2 is a flowchart for explaining the operation of an image reproduction apparatus according to the present invention.

A program for the processing performed in accordance with the flowchart in FIG. 2 is stored in the ROM 15, and is executed by the system controller 8 to control the operations of the individual sections.

It should be noted that in the flowchart in FIG. 2, the term "image feed key" refers to both the image feed switch 13 and the image return switch 14; however, for the simplification of the description, the image feed switch 13 is employed as an example.

First, with the assumption that the reproduction condition has been established by the manipulation of the reproduction switch 12, the processing in FIG. 2 is begun. A check is then performed to determine whether the image feed switch 13 is ON (depressed) or OFF (released) (step S01).

When it is ascertained at step S01 that the image feed switch 13 is OFF, the current count of the images that have been fed is examined (step S02), and when the image count is a number other than 0, images are fed in a number equivalent to this count value and the displayed image is renewed (step S03). Program control is then shifted to step S19. This sequence occurs when the reproduction of image data is delayed in response to the past manipulation of the image feed key.

When at step S02 the number of images that have been fed is 0, program control is shifted directly to step S19.

When the image feed switch 13 is ON at step S01, first, one image is fed in the forward direction, and the displayed image is renewed (step S04). Then, as initial values, a "1", a "10" and "50 msec" are respectively set as the number of images that have been fed, the key timer count and the image renewal time (step S05).

After the initialization, the decrementing of a count value equivalent to a predetermined period of time (e.g., 1.0 sec) is started (step S06).

A check is then performed to determine whether the image feed switch 13 was released while the count value was other than "0", i.e., before the count value was decremented to "0" (step S07). When the image feed switch 13 was released while the count value was other than "0", program control is shifted to step S19. But when the count value had reached "0", program control is shifted to step S08.

At step S08, in accordance with the initial count of the images that have been fed, one image is fed in the forward direction and the displayed image is renewed.

Next, the number of images (files) recorded on the memory card 7 is examined (step S09), and in accordance with the count of the images that have been fed, the initial key timer value that was set is renewed in the following manner.

When it is ascertained at step S09 that the number of images on the memory card 7 is equal to or smaller than five, the value set for the key timer is the initial value "10" (step S10).

At this time, with the image feed switch 13 ON continuously, the interval for renewing the images shown on the display that are sequentially reproduced from the memory card 7 is "renewal interval (seconds)"=the key timer value of "10"×the initial image renewal interval of "50 msec". That is, when the number of images recorded on the memory card 7 is not greater than five and the image feed switch 13 is depressed continuously, images are fed at an interval of 500 msec, and from the memory card 7, one image is reproduced every 500 msec.

When it is ascertained at step S09 that the number of images recorded on the memory card 7 is equal to or greater than six and equal to or smaller than ten, the count of the images that have been fed is examined (step S11), and when the number of images that have been fed (the number of images that have been renewed) is equal to or smaller than five, program control is shifted to step S10 and the images are renewed at the 500 msec interval while the value "10" is set for the key timer.

That is, when the number of images recorded on the memory card 7 is equal to or greater than six and equal to or smaller than ten and the number of images that have been fed is equal to or smaller than five and the image feed switch 13 is depressed continuously, the images are fed at the interval of 500 msec, and from the memory card 7, an image is reproduced every 500 msec.

When, at step S11, the count of the images that have been fed is equal to or greater than six and is equal to or smaller than ten, the key timer value is set to "5" (step S12).

At this time, when the image feed switch 13 is ON continuously, the interval for the renewal of the images on the display that are sequentially reproduced from the memory card 7 is "renewal interval (seconds)"=the key timer value of "5"×the initial image renewal interval of "50 msec". That is, when the number of images recorded on the memory card 7 is equal to or greater than six and equal to or smaller than ten, the number of images that have been fed is equal to or greater than six and equal to or smaller than ten and the image feed switch 13 is depressed continuously, the images are fed at an interval of 250 msec, and from the memory card 7, an image is reproduced every 250 msec.

When it is ascertained at step S09 that the number of images recorded on the memory card 7 is equal to or greater than 11, the count of the images that have been fed is examined (step S13). When the number of images that have been fed (the number of renewed images) is equal to or smaller than five, program control is shifted to step S10, and the images are renewed at the interval of 500 msec, while a value of "10" is set for the key timer.

That is, when the number of images recorded on the memory card 7 is equal to or greater than 11 and the number of images that have been fed is equal to or smaller than five and the image feed switch 13 is depressed continuously, the images are fed at the interval of 500 msec, and from the memory card 7, an image is reproduced every 500 msec.

When, at step S13, the count of the images that have been fed is equal to or greater than six and equal to or smaller than ten, program control is shifted to step S12, and the images are renewed at the interval of 250 msec while the value of "5" is set for the key timer value.

That is, when the number of images recorded on the memory card 7 is equal to or greater than 11 and the number of images that have been fed is equal to or greater than six and equal to or smaller than ten and the image feed switch 13 is depressed continuously, the images are fed at the interval of 250 msec, and from the memory card 7, an image is reproduced every 250 msec.

When, at step S13, the number of images that have been fed is equal to or greater than 11, the value "1" is set for the key timer (step S14).

At this time, while the image feed switch 13 is ON continuously, the interval for renewing the images on the display that are sequentially reproduced from the memory card 7 is "renewal interval (seconds)"=the key timer value of "1"×the initial image renewal interval of "50 msec". That is, when the number of images recorded on the memory card 7 is equal to or greater than 11 and the number of images that have been fed is equal to or greater than 11, and when the image switch 13 is continuously ON, the images are fed at the interval of 50 msec, and from the memory card 7, an image is reproduced every 50 msec.

Following this, in response to the processes at steps S10, S12 and S14, the image on the display is automatically and continuously renewed at renewal intervals that match the individual processes (step S15).

A check is performed to determine whether, while the image feed switch 13 is depressed continuously, the count of the images that have been fed (the number of renewed images) has equaled the total number of images recorded on the memory card 7, i.e., whether all the images have been displayed (step S16). When the count of the images that have been fed does not equal the total number of recorded images, program control is shifted to step S18 and a check is performed to determine whether the image feed switch 13 has been released (step S18). If the image feed switch 13 has not been released, the process beginning at step S15 is repeated while the renewal of the image is continued.

Whereas if the image feed switch 13 has been released, program control is shifted to step S19.

When, at step S16, the number of images that have been fed equals the total number of recorded images, the count of the images that have been fed is reset (step S17), and program control advances to step S19.

Thereafter, at step S19, program control is returned to step S01.

As is described above, according to the embodiment, in an operation wherein images stored on a recording medium are sequentially read and reproduced by depressing the image feed switch 13, as the number of images stored on the recording medium is increased, or as the number of images that have been fed is increased, the interval for feeding images (the interval for renewing a displayed image) is shortened, and image feeding performed at high speed is possible.

In a more detailed explanation for the image feeding operation of the invention the image feeding interval can be set at three levels: a low renewal interval, a medium renewal interval and a high renewal interval. A user can arbitrarily select a renewal interval by changing the initial key timer value.

In the flowchart in FIG. 2, the image feed switch 13 has been employed and images have been reproduced in the ascending order, while referring to the image numbers and the image file names. When instead of the image feed switch 13 the image return switch 14 is so manipulated, exactly the same processing must be performed, with the result, however, that the image feeding direction is reversed (proceeds in the descending order).

Furthermore, the video camera 100 of this embodiment can handle both static images and moving images. For static images, each picture is displayed, whereas for moving images, the first picture may be displayed as a static image or the moving images may be reproduced during a period of time established for a renewal.

Figure 3:
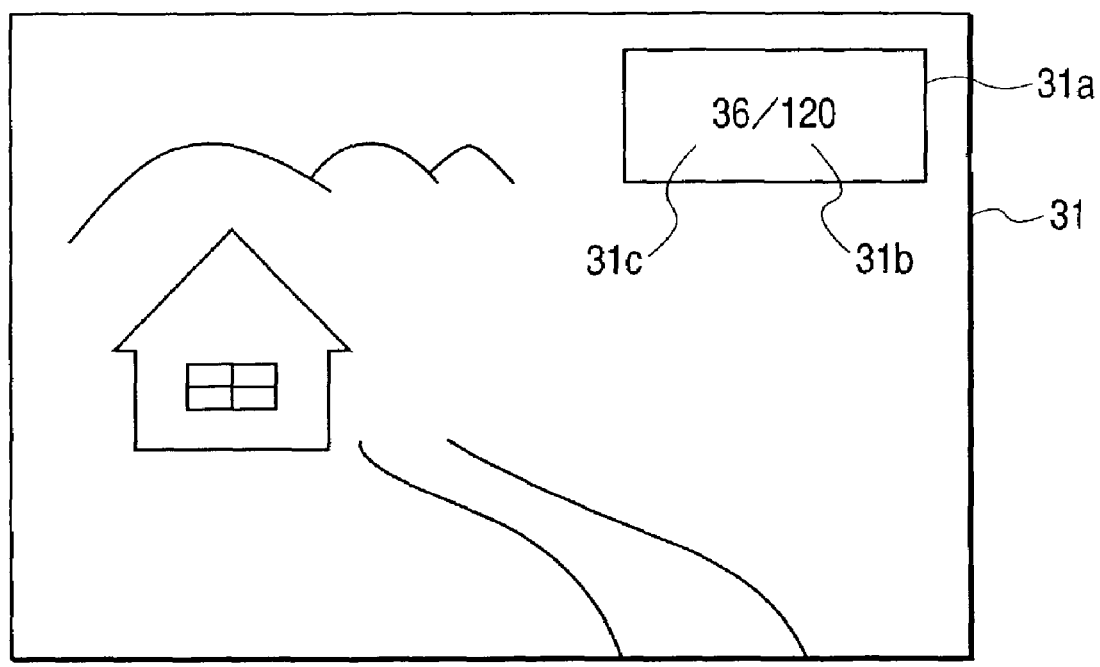
FIG. 3 is a diagram showing an example monitor screen display obtained when the processing according to the flowchart in FIG. 2 is performed.

FIG. 3 is a diagram showing an example display presented on a monitor screen provided for the reproduction operation of the video camera 100 in this embodiment. The image in FIG. 3 is an example displayed on the monitor 9 in FIG. 1.

For the reproduction operation, images sequentially reproduced from a recording medium are displayed on a screen 31 for the monitor 9 in FIG. 3 by manipulating the image feed switch 13 or the image return switch 14. At the same time, the total number of images recorded on the memory card 7 and an image number representing the rank of the currently displayed image are displayed. The image number is a serial number that is uniquely defined by the video camera in accordance with file information, such as the image file name and the image recording time.

In FIG. 3, a total count 31b of the images recorded on a recording medium and an image number 31c for the image that is currently being displayed are presented in a number display portion 31a. The total count 31b and the image number 31c are represented as a fraction, so that the two values can be easily identified visually.

When an image is fed by depressing the image feed switch 13 while the image in FIG. 3 is displayed on the screen, the image number is incremented by one as the image is renewed. And when an image is returned (an image is fed in the backward direction) by manipulating the image return switch 14, the image number is decremented by one as the image is renewed.

When an image is arbitrarily displayed by manipulating the image feed switch 13 or the image return switch 14, and when the relevant switch, 13 or 14, is released, the renewal for the image that is currently selected is halted, and the arbitrarily selected image is displayed. Thus, an operator can select a desired image by manipulating either the image feed switch 13 or the image return switch 14 while referring to the count shown on the display in FIG. 3.

As is described above, according to the present invention, the renewal speed for the image feeding operation is changed in accordance with the total number of images recorded on the recording medium and the number of images that have been renewed since the image feeding was begun. Therefore, a desired image can be appropriately searched for, without the result being affected by the number of images recorded on the recording medium.

What is claimed is:

1. An image reproduction apparatus comprising:
   reproduction means for reproducing an image recorded on an image recording medium which recorded a plurality of images;
   display control means for displaying, on a display unit, the image reproduced by said reproduction means;
   renewal means for renewing the image displayed on said display unit; and
   control means for, in accordance with the number of images recorded on said recording medium, changing an interval at which said renewal means renews displayed image.

2. An image reproduction apparatus according to claim 1, wherein said control means reduces said interval as the number of said images stored on said recording medium is increased.

3. An image reproduction apparatus according to claim 1, wherein said control means initializes said renewal when the number of images that have been renewed, since said renewal means began the renewal of said displayed image, is equal to the number of said images recorded on said recording medium.

4. An image reproduction apparatus according to claim 1, wherein said renewal means is a switch used for displaying an image differing from said displayed image, and includes
   a first function for renewing said displayed image the equivalent of the number of times that said switch is depressed and for providing a different image each time, and
   a second function for, while said switch is depressed for an extended period of time, automatically and sequentially reading multiple images from said recording medium, and for sequentially renewing said multiple images on the display.

5. An image reproduction apparatus comprising:
   reproduction means for reproducing an image recorded on an image recording medium which recorded a plurality of images;
   display control means for displaying, on a display unit, the image reproduced by said reproduction means;
   renewal means for renewing the image displayed on said display unit; and
   control means for, in accordance with the number of images renewed by said renewal means, changing an interval at which said renewal means renews displayed image.

6. An image reproduction apparatus according to claim 5, wherein said control means reduces said interval as the number of images that have been renewed, since said renewal means began the renewal of said displayed image, is increased.

7. An image reproduction apparatus according to claim 5, wherein said control means initializes said renewal when the number of images that have been renewed, since said renewal means began the renewal of said displayed image, is equal to the number of said images recorded on said recording medium.

8. An image reproduction apparatus according to claim 5, wherein said renewal means is a switch used for displaying an image differing from said displayed image, and includes
   a first function for renewing said displayed image the equivalent of the number of times that said switch is depressed and for providing a different image each time, and
   a second function for, while said switch is depressed for an extended period of time, automatically and sequentially reading multiple images from said recording medium, and for sequentially renewing said multiple images on the display.

9. An image reproduction apparatus comprising:
   reproduction means for reproducing an image recorded on an image recording medium which recorded a plurality of images;
   display control means for displaying, on a display unit, the image reproduced by said reproduction means;
   renewal means for renewing said images displayed on said display unit; and
   control means for, in accordance with the number of images recorded on said recording medium and the number of images renewed by said renewal means, changing an interval at which said renewal means renews displayed image.

10. An image reproduction apparatus according to claim 9, wherein said control means reduces said interval as the number of said images stored on said recording medium is increased.

11. An image reproduction apparatus according to claim 9, wherein said control means reduces said interval as the number of images that have been renewed, since said renewal means began the renewal of said displayed image, is increased.

12. An image reproduction apparatus according to claim 9, wherein said control means permits said renewal means to renew said displayed image at a renewal interval that is consonant with the number of images that have been renewed since said renewal of said displayed image was begun, and the number of said images recorded on said recording medium.

13. An image reproduction apparatus according to claim 9, wherein said control means initializes said renewal when the number of images that have been renewed, since said renewal means began the renewal of said displayed image, is equal to the number of said images recorded on said recording medium.

14. An image reproduction apparatus according to claim 9, wherein said renewal means is a switch used for displaying an image differing from said displayed image, and includes
   a first function for renewing said displayed image the equivalent of the number of times that said switch is depressed and for providing a different image each time, and
   a second function for, while said switch is depressed for an extended period of time, automatically and sequentially reading multiple images from said recording medium, and for sequentially renewing said multiple images on the display.

15. An image reproduction method comprising:
   a reproduction step of reproducing an image recorded on an image recording medium which recorded a plurality of images;
   a display step of displaying, on a display unit, the image reproduced at said reproduction step;
   a renewal step of renewing the image displayed on said display unit; and
   a control step of, in accordance with the number of images recorded on said recording medium, changing an interval at which displayed image is renewed at said renewal step.

16. An image reproduction method according to claim 15, wherein, at said control step, said interval is reduced as the number of said images stored on said recording medium is increased.

17. An image reproduction method according to claim 15, wherein, at said control step, said renewal is initialized when the number of images that have been renewed, since the renewal of said displayed image was begun at said renewal step, is equal to the number of said images recorded on said recording medium.

18. An image reproduction method according to claim 15, wherein said renewal step includes
   a first process for renewing said displayed image the equivalent of the number of times that a switch used for said renewal is depressed and for providing a different image each time, and
   a second process for, while said switch is depressed for an extended period of time, automatically and sequentially reading multiple images from said recording medium, and for sequentially renewing said multiple images on the display.

19. An image reproduction method comprising:
   a reproduction step of reproducing an image recorded on an image recording medium which recorded a plurality of images;
   a display step of displaying, on a display unit, the image reproduced at said reproduction step;
   a renewal step of renewing the image displayed on said display unit; and
   a control step of, in accordance with the number of images renewed at said renewal step, changing an interval at which displayed image is renewed at said renewal step.

20. An image reproduction method according to claim 19, wherein, at said control step, said interval is reduced as the number of images that have been renewed, since the renewal of said displayed image was begun at said renewal step, is increased.

21. An image reproduction method according to claim 19, wherein, at said control step, said renewal is initialized when the number of images that have been renewed, since the renewal of said displayed image was begun at said renewal step, is equal to the number of said images recorded on said recording medium.

22. An image reproduction method according to claim 19, wherein said renewal step includes
   a first process for renewing said displayed image the equivalent of the number of times that a switch used for said renewal is depressed and for providing a different image each time, and
   a second process for, while said switch is depressed for an extended period of time, automatically and sequentially reading multiple images from said recording medium, and for sequentially renewing said multiple images on the display.

23. An image reproduction method comprising:
- a reproduction step of reproducing an image recorded on an image recording medium;
- a display step of displaying, on a display unit, the image reproduced at said reproduction step;
- a renewal step of renewing the image displayed on said display unit; and
- a control step of, in accordance with the number of images recorded on said recording medium and the number of images renewed at said renewal step, changing an interval at which displayed image is renewed at said renewal step.

24. An image reproduction method according to claim 23, wherein, at said control step, said interval is reduced as the number of said images stored on said recording medium is increased.

25. An image reproduction method according to claim 23, wherein, at said control step, said interval is reduced as the number of images that have been renewed, since the renewal of said displayed image was begun at said renewal step, is increased.

26. An image reproduction method according to claim 23, wherein the control is exercised at said control step, so that, at said renewal step, said displayed image is renewed at a renewal interval that is consonant with the number of images that have been renewed since said renewal of said displayed image was begun at said renewal step, and the number of said images recorded on said recording medium.

27. An image reproduction method according to claim 23, wherein, at said control step, said renewal is initialized when the number of images that have been renewed, since the renewal of said displayed image was begun at said renewal step, is equal to the number of said images recorded on said recording medium.

28. An image reproduction method according to claim 23, wherein said renewal step includes
- a first process for renewing said displayed image the equivalent of the number of times that a switch used for said renewal is depressed and for providing a different image each time, and
- a second process for, while said switch is depressed for an extended period of time, automatically and sequentially reading multiple images from said recording medium, and for sequentially renewing said multiple images on the display.

* * * * *

UNITED STATES PATENT AND TRADEMARK OFFICE
CERTIFICATE OF CORRECTION

PATENT NO. : 7,177,523 B2  Page 1 of 1
APPLICATION NO. : 10/213188
DATED : February 13, 2007
INVENTOR(S) : Matsumoto It is certified that error appears in the above-identified patent and that said Letters Patent is hereby corrected as shown below:

THE TITLE PAGE ITEM ( 73 ) PLEASE DELETE TOYKO AND INSERT TOKYO

Signed and Sealed this

Seventh Day of August, 2007

JON W. DUDAS
*Director of the United States Patent and Trademark Office*